United States Patent
Le Henaff

(10) Patent No.: US 10,936,791 B2
(45) Date of Patent: Mar. 2, 2021

(54) DYNAMICALLY CHANGING TEXT WHEREIN IF TEXT IS ALTERED UNUSUAL SHAPES APPEAR

(71) Applicant: Guy Le Henaff, Montreal (CA)

(72) Inventor: Guy Le Henaff, Montreal (CA)

( * ) Notice: Subject to any disclaimer, the term of this patent is extended or adjusted under 35 U.S.C. 154(b) by 0 days.

(21) Appl. No.: 15/514,257

(22) PCT Filed: Sep. 25, 2015

(86) PCT No.: PCT/CA2015/050958
§ 371 (c)(1),
(2) Date: Mar. 24, 2017

(87) PCT Pub. No.: WO2016/044946
PCT Pub. Date: Mar. 31, 2016

(65) Prior Publication Data
US 2017/0301115 A1 Oct. 19, 2017

Related U.S. Application Data

(63) Continuation-in-part of application No. 14/498,247, filed on Sep. 26, 2014, now Pat. No. 10,402,471.

(51) Int. Cl.
*G06F 17/00* (2019.01)
*G06F 40/109* (2020.01)
(Continued)

(52) U.S. Cl.
CPC .......... *G06F 40/109* (2020.01); *G06F 40/106* (2020.01); *G06T 11/203* (2013.01); *H04L 67/32* (2013.01); *H04L 2209/16* (2013.01)

(58) Field of Classification Search
CPC .... G06F 17/212; G06F 40/109; G06F 40/106; H04L 67/32; H04L 2209/16; G06T 11/203
See application file for complete search history.

(56) References Cited

U.S. PATENT DOCUMENTS 8,762,828 B2 6/2014 Le Henaff
9,477,836 B1 * 10/2016 Ramam ............... G06F 21/6263
(Continued)

FOREIGN PATENT DOCUMENTS

EP 2938087 10/2015
EP 2938087 A1 * 10/2015 ........... H04N 21/235

OTHER PUBLICATIONS

International Search Report issued in International Application No. PCT/CA2015/050958 dated Nov. 20, 2015 (3 pages).
(Continued)

*Primary Examiner* — Cesar B Paula
*Assistant Examiner* — Benjamin J Norris
(74) *Attorney, Agent, or Firm* — Hamre, Schumann, Mueller & Larson, P.C.

(57) ABSTRACT

The present document describes system and method for securing a text against copying and tampering. The system introduces a reversible change within the instructions contained in the electronic page description language defining the text. In a non-limiting example, the reversible change may include replacing the font used in the PDL by a customized font defining a set of changes from the standard/existing fonts. The system may then generate a set of instructions reversing the set of changes to display the proper text to the user. However, should any tampering or illegal copying of the text occur, the original text will not be displayed because a portion of the reversible change is not present. The reversible changes introduced may affect character sizes, colors, spacing, positions, mapping etc.

17 Claims, 12 Drawing Sheets

(51) Int. Cl.
*G06F 40/106* (2020.01)
*G06T 11/20* (2006.01)
*H04L 29/08* (2006.01)

(56) References Cited

U.S. PATENT DOCUMENTS

| | | |
|---|---|---|
| 2008/0301431 A1 | 12/2008 | Hea |
| 2009/0254810 A1 | 10/2009 | Mitsui |
| 2009/0254819 A1* | 10/2009 | Song .................... G06F 17/273 |
| | | 715/257 |
| 2014/0022260 A1 | 1/2014 | Atteberry et al. |
| 2015/0169508 A1* | 6/2015 | Nordback ........... G06F 17/2247 |
| | | 715/234 |
| 2015/0326392 A1* | 11/2015 | Cheng ...................... H04L 9/30 |
| | | 380/28 |
| 2016/0092409 A1 | 3/2016 | Le Henaff |

OTHER PUBLICATIONS

Written Opinion issued in International Application No. PCT/CA2015/050958 dated Nov. 20, 2015 (4 pages).

* cited by examiner

WAgons
FIGURE 1a
FIGURE 1b
FIGURE 1c

FIGURE 6
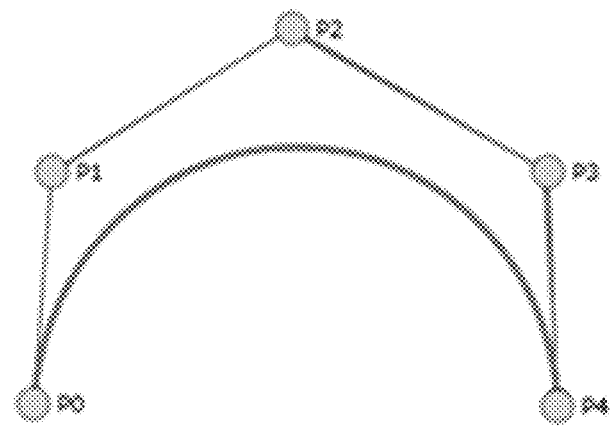
FIGURE 7
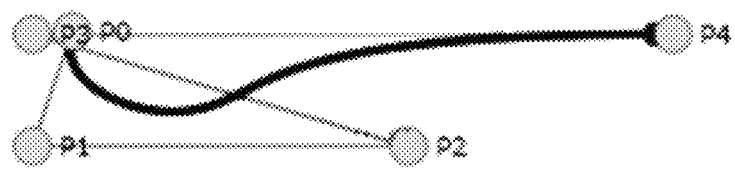
FIGURE 8
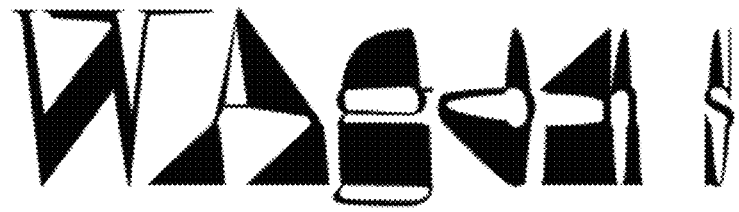
FIGURE 9

```
%% PDF Font object that describe the Font information
4 0 obj
<<
/Type/Font /Subtype/Type1 /Encoding /WinAnsiEncoding %% <= standard mapping  A=>A,
/FontDescriptor
       <<
       /Type /FontDescriptor/FontBBox [-560 -303 1523 1051]
       /FontName /Times-Roman
       /BaseFont /Times-Roman           <--------------- 150
       /FontFile2 7 0 R         %% <= reference to data of the Font glyphs
       >>
%% Char ASCII indexed 65 (A) to 87 (W) <--------------- 151
/FirstChar 66 /LastChar 85
/Widths [250 0 0 0 0 0 778 0 0 0 0 0 0 333 250 0 0 0 0 0 0 0 500]
>>

%% PDF Ressource object Linking Font name (here "/TRoman") and Font object
5 0 obj
<<
                                       152
       /Font<</TRoman 4 0 R>>  %% /TRoman used to call object 4 0 obj
>>
endobj
%% Normal use of a non obfuscated Font
%% PDF PDL (Page Description Language) drawing "WAGON" using normal font
6 0 obj
stream
12 0 0 12 83.88 617.074 Tm     %% <= Default Transformation of Space to Media
BT
/TRoman 1 Tf                   %% Select un-obfuscated font /TRoman (object 4 0 obj)
-0.002 Tc                      %% <= Set a default Character spacing
0 Tw                           %% <= Set a default Word spacing
[(WAGON)]TJ                    %% display order for letters of word WAGON
ET
endstream
endobj
...              153
```

FIGURE 14a

```
%% PDF Font object that describe the Font information
4 0 obj
<<
/Type/Font /Subtype/Type1 /Encoding /WinAnsiEncoding  %% standard mapping  A=>A,
>>                                      %% However Glyph drawings had been re-shuffled
                                        %% Like Glyph at B place is doing W drawing etc
...
/FontDescriptor
       <<
       /Type /FontDescriptor/FontBBox [-560 -303 1523 1051]
       /FontName /Times-RomanOBSCURED1452
       /FontFile2 8 0 R          %% <= reference to glyphs of the Obfuscated font
       >>
                          ↖ 157                    ← 154
%% Char ASCII indexed 66 (B) to 85 (U)
/FirstChar 66 /LastChar 85
/Widths [250 0 0 563 0 0 0 0 0 345 0 0 333 250 0 0 0 0 0 250]
>>

%% PDF Ressource object Linking Font name (here "/TRoman") and Font object
5 0 obj
<<                           ← 156
       /Font<</TRoman 4 0 R>>  %% /TRoman used to call object 4 0 obj
>>

%% PDF PDL (Page Description Language) drawing "WAGON" using obfuscated font
6 0 obj
stream
12 0 0 12 83.88 617.074 Tm   %% <= Default Transformation of Space to Media
BT
/TRoman 1 Tf                 %% Select obfuscated font /TRoman (object 4 0 obj)
-0.002 Tc                    %% <= Set a default Character spacing
0 Tw                         %% <= Set a default Word spacing
[(B)-24(K)48(U)-27(E)(N)]TJ  %% The word WAGON with simple char transposition
                             %% W => B, A => K, G => O, O => E
                             %% (WAGON) become (BKUEN). Obfuscating clip board
                             %% capture. TJ instruction show text strings
                             %% allowing individual glyph positioning.
                             %% amount is subtracted from current x coordinate
        155                  %% here -24 => (K) that draw "A" is shifted left
                             %% and overlay (B) that draw "W", but "F1" Font
                             %% had Kerning value (not shown) that artificially
                             %% shifting by +24 right here -27 imply that the
                             %% (E) that draw "O" is shifted left and overlay
(U)                          %% that draw "G" but "F1" Font had Kerning value
                             %% (not shown) artificially shifting by +27 right
ET
endstream
endobj
```

FIGURE 14b

```
4 0 obj
<<
/Type /Font /Subtype /Type1/FirstChar 66 /LastChar 85
/FontDescriptor
       <<
       /Type /FontDescriptor   /ItalicAngle 0 /StemV 0
       /Ascent 1005/Descent -209/Flags 32 /FontBBox [-560 -303 1523 1051]
       /FontName /VerdanaOBSCURED1452
       /FontFile2 16 0 R       %% <= reference to data of the Obfuscated font
       >>
%% Char ASCII indexed 66 (B) to 85 (U)
/Widths [250 0 0 563 0 0 0 0 345 0 0 333 250 0 0 0 0 250]
/Encoding /WinAnsiEncoding    %% <= refer to a standard mapping  A=>A,
>>                             %% However Glyph drawings had been re-shuffled
                               %% Like Glyph at B place is doing W drawing etc ...
                               Kerning Table had been modified like asking A glyph
                               to be shifted left by a 1 char spacing Default size
                               can also be modified (not in this example for sake
                               of simplicity)

...
%% PDL (Page Description Language) here a PDF format,
%% drawing "WAGON" using obfuscated tailored font
stream
BT
/F1 1 Tf                      %% <= select the properly modified font /F1
12 0 0 12 83.88 617.074 Tm    %% <= Default Transformation of Space to Media
q                             %% save transform
.25 0 0 .25 0 0 Tm            %% zoom down 25% Horizontal and Vertical
[(B)]TJ                       %% char "W" (that self expand 4 time H and V)
Q                             %% restore default Zoom
q                             %% save transform
4 0 0 5 0.24 0 Tm             %% 400% zoom H 500 zoom V, shift X pos (the .24)
[(K)]TJ                       %% char "A" (that self shrink 4 time H and 5 time
V)
Q                             %% restore default Zoom
[+48(U) -27(E)(N)]TJ          %% The rest of the word WAGON with a right
                                displacement of +48 to account for "WA" drawn ET
endstream
endobj
..
```

FIGURE 14c

```
%!PS-Adobe-3.0
...
%% Take a Verdana font size 10 and make it current
/Verdana findfont 10 exch scalefont  setfont %% Set a current
699 690 moveto
%% draw "WAGON" using
(WAGON)[72 72 72 72  0] /xshow
showpage
```

FIGURE 14d

```
%!PS-Adobe-3.0
%% Take The obfuscated font
/VerdanaOBSCURED1452 findfont

%% Call the specially made PostScript Operator
%% that will convert the Glyp part to relevant Glyph Path
%% It use a unique user Key 1883874782782 as a decoding matching
%% the fontis tailored to use this key as a seed for converting beziers
curve
%% trans
%% PostScript is a language and as such allow to run data operator
%% on stacked data, Here the font dictionary that include glyph definition

1883874782782 DEFUSCATE

%% make it a size 10 and make it current
10 exch scalefont  setfont

%% Set a current
699 690 moveto

%% draw "WAGON" using the obfuscated font and glyph altered
%% the operator allow to specify the shift for each character individually
% hence the -24 -27 that compensate for intrinsic font change in kerning
table
(BKUEN)[-24 72 -27 72  0] /xshow showpage
...
```

FIGURE 14e

DYNAMICALLY CHANGING TEXT WHEREIN IF TEXT IS ALTERED UNUSUAL SHAPES APPEAR

CROSS-REFERENCE TO RELATED APPLICATIONS

This application claims priority of U.S. non-provisional patent application Ser. No. 14/498,247, filed on Sep. 26, 2014 the specification of which is hereby incorporated by reference in its entirety.

BACKGROUND

(a) Field

The subject matter disclosed generally relates to a method and system for encrypting/securing text.

(b) Related Prior Art

Co-invented U.S. Pat. No. 8,762,828 describes a system and method for tracking an electronic document in an electronic publication by embedding a message in the electronic document, the message being used to verify the presence and authenticity of the electronic document in the electronic publication. However, it is still possible to tamper with the electronic document after it has been secured. One of the methods for doing so is by overriding the existing font and replacing it with a new one.

Therefore, there is a need for a system and method which allow for detecting such overriding activities to determine the authenticity of the electronic document in question.

Obfuscation and ciphering are widely known in the art for securing electronic documents and preventing and detecting tampering. However, in some scenarios the obfuscation is not possible due to the content of the document. Examples of such scenarios are provided below.

One of these scenarios is when the display on the display device e.g. Monitors/screens, is done using an application does not support encryption/decryption. Take for example a display on a web browser of an HTML page. Aside of the HTTPS protocol, browsers do not support and/or include decryption algorithms aimed at decrypting an encrypted payload.

Another scenario is when the decryption process must be done using local resources that are only available to the proper recipient. For example, to control distribution of a digital document, a local font of the proper aspect can be tailored and installed only on a specific end user. Only this one will be able to read the document. This personalized local font will allow reversing the pre-transformed page during font rendering to reconstruct the display.

A further scenario is when the encryption process involves specific portions of the pages leaving others un-obfuscated. This scenario is either not possible or very complicated to the point where it requires extensive modifications that are against the paradigm of the PDL.

On another aspect aside of the needs expressed above, there is a need in the publishing industry to protect the display of content either for security purposes or for monetary reasons. When dealing with copyright protection needs such as to avoid illegal copying from reader to reader, the publishing industry uses DRM (Digital Rights management) in the form of copy protection or at least to sign a document to track its use.

However, the open standards of PDL (Page Description Language) like ePub (which is HTML based) or PDF or OXPS can be handled using software available as source in Open Source licensing schemes or other methods such as MuPDF from Artifex, iText etc. The access to sources and perfect understanding of the geometrical structure of a document de-facto opens the inner part of the data. Primarily done for sake of rendering and arranging the characters list and organizing display, this also becomes a major safety loophole as it allows to catch the content after crossing the encryption barriers.

A similar situation occurred in the video industry where a DRM controlled video stream decryption ends up generating a pixel buffer that in turn can be caught and recorded without DRM. In response, the video industries adopted an end to end approach where the display device itself participates in the decryption. For example the HDMI standard interface allows the last phase of deciphering to occur within the display device itself. In these cases there is no memory true representation of the picture because the display is equipped with an embedded decryption hardware. So that working around encryption requires a few magnitude of increases in competencies.

However, the publishing industry does not have access to such technology even the HMDI technique discussed above is essentially vector based rather than pixel based. Also, the current trends are to use completely open formats and methods for rendering PDL. This is frequently done using software with access source code. It is then easy to create software programs that load, decipher and save the data without any DRM left on it and no methods exist to avoid this for the suppliers of PDL SDK.

However when going for display, a page requires a relationship between the character to display and the related shape (glyph) to render. This relationship and the related geometrical parameters are numerous and the default choice is the simplest one, but this is also an arbitrary choice, because the order sent to the rendering unit for the character involves complex geometrical rules and many different variation of said parameters can lead to the same display aspect.

Therefore, there remains a need for a system and method which address the shortcomings of the prior art.

SUMMARY

The present embodiments describe such system and method.

The embodiments augment the complexity of the above described PDL rules in glyph rendering so that interception of the content can only result in obtaining useless information while the display stays consistent when using the tailored glyph arrangements and geometry properly (when in a decoded/decrypted form). The embodiment take proper measure to avoid pattern of coding to appear in the tailored font. This does not prevent the rendering engine to "draw" something but the result of what is going to be displayed will be unfriendly/illegible/resistant to reverse ciphering. This approach is compatible with almost all known DRM as it does not introduces any change in the PDL itself or its container. It is even compatible across publishing software like going from a Microsoft Word to PDF keeping proper display as well as the embedded obfuscation scheme for proper deciphering.

Splitting part or the geometrical work for obfuscation in the font and another part in the display list allows to control display, by controlling the font, to set a signature specific on each file delivered in the form of a tailored font and allows to avoid reconstruction of the text content. As all the protection is embedded in the device and the PDL file, the established protection can work even offline i.e. without requiring a DRM system where the highest security is only available when the DRM is working online.

According to an aspect, there is provided a method for obfuscating an electronic document including a text, the method comprising: detecting an existing font used in an electronic page description of the electronic document; replacing the existing font with a customized font, said customized font including a first set of changes that distinguish the customized font from the existing font; modifying instructions of the electronic page description including introducing a second set of changes, the second set of changes being configured to reverse the first set of changes; thereby producing an obfuscated electronic document which allows for displaying the text only when the first set of changes and the second set of changes are present at rendering time.

In one embodiment, replacing the existing font comprises analyzing the existing font and modifying the existing font using a set of controlled randomization changes to generate the customized font from the existing font.

In another embodiment, the method further comprises providing one of: the customized font and the second set of changes at rendering time.

In another embodiment, the method comprises providing, in the electronic page description, instructions which when executed allow for retrieving the customized font or the second set of changes from a local or remote memory.

In a further embodiment, the existing font is a standard font, a base font fetched from a library of fonts, or a non-standard font that complies with the PDL.

In yet a further embodiment, introducing a second set of changes comprises one or more of:
  introducing changes affecting character to glyph mapping wherein the second set of changes include instructions to display a different text;
  introducing changes affecting sizes of characters;
  introducing changes affecting curves and/or control points defining the curves and/or lines;
  introducing changes affecting positions of characters and/or spacing between characters;
  introducing changes affecting character colors; and
  introducing changes affecting one or more of: sizes of characters, lines and/or curves and/or control points defining the curves, character to glyph mapping, and character colors.

In a further aspect, there is provided a method for obfuscating an electronic document including a text, the method comprising: searching for a font used in an electronic page description of the electronic document associated with the text. If a font is detected, the method comprises introducing a reversible change in the electronic page description of the text, comprising replacing the detected font with a customized font including a set of changes and generating instructions to reverse an effect of the set of changes. Otherwise, if no font is detected, the method comprises fetching a base font from a library and introducing a reversible change in the electronic page description of the text, comprising modifying the base font to include the set of changes and generating instructions to reverse the effect of the set of changes. Thereby producing a secure electronic document which allows for displaying the text only when the set of changes and the instructions reversing the set of changes are present at rendering time.

In an embodiment, replacing the detected font comprises analyzing the detected font and modifying the detected font using a set of controlled randomization changes to generate the customized font from the detected font.

In another embodiment, the method further comprises providing one of: the customized font and the second set of changes at rendering time.

In yet a further embodiment, the method further comprises providing, in the electronic page description, instructions which when executed allow for retrieving the customized font or the second set of changes from a local or remote memory.

In yet a further aspect, there is provided an apparatus for obfuscating an electronic document including a text, the apparatus comprising: a font detector adapted to detect an existing font used in an electronic page description (PDL) associated with the electronic document; a font obfuscation module adapted to analyze the existing font and modify the existing font using a set of controlled randomization changes to generate a customized font having a first set of changes which differentiate the customized font from the existing font; a PDL obfuscation module adapted to analyze the PDL and the first set of changes to modify the PDL by introducing a second set of changes configured to reverse an effect of the first set of changes; and a PDL re-integration module adapted to integrate the second set of changes and the first set of changes into an obfuscated PDL which is compatible with conventional PDL readers.

The apparatus may be configured to analyze the existing font and modify the existing font using a set of controlled randomization changes to produce the obfuscated font.

The font detector may be configured to search for the existing font in the PDL and if no font is specified, the font detector is configured to fetch a base font from a library and set the base font as the existing font.

The apparatus may be adapted to store the customized font or the second set of changes in a location outside the PDL and provide in the PDL instructions which when executed cause the customized font or the second set of changes to be retrieved at rendering time. Wherein if one of the customized font and the second set of changes is absent at rendering time, execution of the PDL results in a different text being displayed.

The following terms are defined below.

The term "standard font" is intended to mean an available font having known characteristics such Arial, Calibri, Times New Roman etc. Usually standard fonts have common characteristics such as character mapping and spacing between characters. The main difference between the different standard fonts is the glyph which the drawing is used to display a given character e.g. "B" and "B" are the glyphs of the second character in the alphabet in different fonts (Arial and Algerian respectively).

The embodiments may also apply to any existing font in the electronic document whether the existing font is a standard font or a slightly modified font as long as the existing font has a format that complies with the PDL e.g. any font encoded in true type, type 1, type 2, type 3, Adobe® type format, open type etc.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1a illustrates the drawing of the word "Wagons" as it should normally look;

FIG. 1b illustrates the bounding box of the characters W and the bounding box of character A;

FIG. 1c shows a slight overlap in the bounding boxes for W and A;

FIG. 6 illustrates the control points of the word "WAgons" of FIG. 1a;

FIG. 7 illustrates the control points P0 to P4 defining three Bezier curves together defining an arch;

FIG. 8 illustrates an example of the Bezier curves of FIG. 7 when the control points P0-P4 have been displaced;

FIG. 9 illustrates an exemplary drawing of the word "Wagons" of FIG. 6 when the control points have been displaced:

FIG. 14a there is shown the electronic page description of a regular non obfuscated font in PDF for the word "WAGON";

FIG. 14b illustrates an example of an obfuscated electronic page description for displaying the word "WAGON" in PDF;

FIG. 14c illustrates another example of an obfuscated electronic page description for displaying the word "WAGON" in PDF;

FIG. 14d shows an example of an electronic page description of a regular non obfuscated font in Postscript for the word "WAGON";

FIG. 14e illustrates an example of an obfuscated electronic page description in Postscript for displaying the word "WAGON";

It will be noted that throughout the appended drawings, like features are identified by like reference numerals.

DETAILED DESCRIPTION

Figure 2:
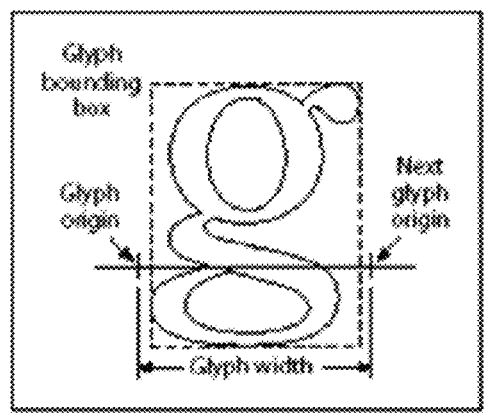
FIG. 2 illustrates an example of the glyph drawing for the character g.

The embodiments describe a system and method for securing a text against copying and tampering. The system introduces a reversible change within the instructions contained in the electronic page description language defining the text. In a non-limiting example, the reversible change may include replacing the font used in the PDL by a customized font defining a set of changes that differentiate the customized font from the standard fonts. The system may then generate a set of instructions configured to reverse the set of changes to display the proper text to the user. However, should any tampering or illegal copying of the text occur, the original text will not be displayed because a portion of the reversible change would not be present. The reversible changes introduced may affect character sizes, colors, spacing, positions, mapping etc.

When a text is displayed, it is first considered as a set of characters wherein each character calls a specific drawing procedure made of lines/vector and curves. The different drawing aspects of the each character are controlled by the designer of the character, and the group of characters is called a font. Examples of fonts include: Arial, Calibri, Times New Roman etc.

A font is the set of drawings the system uses to identify which drawing should be called for displaying which characters. The font may also contain additional information on the way to consider the drawing, its size, and the displacement to use between the given character and the next one.

Each individual drawing for a character of a font is called a glyph, and is made of segment generally using two operators, line and curves. The disposition of lines and curves are preset in a way that allow some computation at rendering time, most font file format also contain provision to define the mapping between the character code and the glyph that must be associated with it. Many font formats contain provision that allow more than one description of a glyph for same characters, the purpose being to allow selection of best drawing depending upon either a choice like bold italic, or because rendering size is best done using a specific one.

The apparatus in accordance with the present embodiments is compatible with all the different possibilities but for the sake of simplicity and ease of explanation the present document will focus on the case where there is one glyph for each character and a mapping method exists between these 2 objects the character code and its representation, using method like lookup table (also called mapping vector).

In an embodiment, the obfuscation may be performed extensively on the font characteristics' level for example by modifying the zoom/size, displacement, color, rotation, character to glyph mapping etc. of the characters. However, some characteristics are intrinsic to the font and can be handled in the text and in reverse without requiring any special handling of the font data.

The simplest example is to modify the font by zooming down the description of a character by a certain factor, while zooming up in reverse with the same factor the text that should be displayed. For example, instructions may be provided in the electronic page description of the document, which will zoom down the description of the character by a factor of e.g. 3.5 and zoom up the text that will be displayed by a factor of 3.5. The instructions may be dispersed within the page description of the document such that it will be very difficult to track which instructions belong to which character. Whereby, only the proper font will allow for a normal display of the characters. Otherwise if the font is tampered the text will appears abnormally big or small or spaced and each character may overlap another so much that the appearance of the text will be very difficult to read.

The level of complexity offered by intrinsic obfuscation is sufficient to implement a complex scheme that defies at least simple attempts of break-in. Typically, this is achieved with characters transformation, displacement and exchange of drawing aspect with characters. For example, it is possible to display the drawing of B character when the real character entered is A, or display the drawing of character Z when the character typed is in fact B etc. Such transformation/exchange may be amplified by the capacity to use many characters descriptions which now easily include 65 000 character definitions making the obfuscation impossible to break using a statistical code breaker.

However, some file formats or environments like HTML5, SVG, Adobe PostScript provide a scripting language on the receiving side. This allows for extensive modification of the font glyph itself. In particular, this allows to handle modifications within the drawing of the glyph itself so that the aspect of the drawing cannot be re-interpreted if the rules used to modify the position of drawing control point is not known.

The latter option is provided atop the intrinsic obfuscation capability which hardens the obfuscation even further and also gives capabilities to remotely enable or disable the display by sending or not the proper scripting code that will pre-process the font to restore the non-intrinsic capabilities or a combination with the intrinsic capabilities. In other words, both the modified font and the proper scripting code embedded in the PDL have to be present and available at rendering time. Otherwise, the text would not properly display.

The method may be implemented in two major embodiments depending on the availability of a scripting language that can handle the font data at the remote site. These embodiments include: Intrinsic alterations, and non-intrinsic alterations.

Intrinsic Alterations: Kerning Table

A character aspect is characterized by three main types of data:
 Transformation Matrix
 Color; and
 Glyph content including lines and curves mainly Bezier curves, BSpline, arc etc.).

Kerning is the process of adjusting the spacing between characters to achieve a visually pleasing result. In an embodiment, Kerning may be used as a method for obfuscating the text as exemplified below with respect to FIGS. 1a to 1c which illustrate examples of position alterations allowed by font Kerning. Kerning is the part of definition for each character and is sometime even defined relative to next or previous character. The kerning defines a "shift to next" distance for each character to define the distance between adjacent characters. Embodiments of the invention use the kerning value to obfuscate the display of the text so that only the proper code provided in the un-altered electronic page description of the document may diffuse/cancel/compensate for the modifications so that only the unaltered text can look normal and/or legible.

FIG. 1a illustrates the drawing of the word "Wagons" as it should normally look. FIG. 1b illustrates the bounding box of the characters W and the bounding box of character A. In the example of FIG. 1b the kerning value is set to 0 for the W-A character spacing relation. This is clearly shown in the fact that the bounding boxes for W and for A do not overlap. Now turning to FIG. 1c, there is shown a slight overlap in the bounding boxes for W and A. This overlap is due to the fact that a non-zero Kerning value was applied resulting in a decreased spacing between the bounding boxes of A and W.

Kerning is sometimes defined inside the format, and some other time it requires that the editing application alters the position individually. For example, by altering the kerning table or kerning computation it is possible to overlay (overlap them one on top of the other) the characters either all within same page, or at least by groups. The limitation can come from the arithmetic used for the type definition and the possible rounding error, so that the need to restore original computation required to account for rounding errors, hence may require to reduce the swing of curves controlled displacement to use.

This capability is available in most font description formats like Adobe Type1 or TrueType or OpenType to mention a few, and allows controlling the characters overlap of the bounding box. The embodiments use this capacity as a way to move characters without requiring the text description to deal with this matter.

This also means that if a character of the text is artificially moved to some specific locations using the present obfuscation technique then the font of the text must contain information tailored to rectify this specific move when the text is displayed so that the text can look normal. Using the present obfuscation technique, attempts to copy the text using for example "Ctrl-C" would make the text pasted using "CRTL-V" unreadable and even of no sense while being properly displayed if rendered using the proper font that includes the kerning table that reverses the positioning shift artificially induced in the text.

Intrinsic Alterations: Glyph Alterations by Pre-Modification of the Transformation Matrix As discussed above, each character is mapped to a specific drawing called a glyph. For example, FIG. 2 illustrates an example of the glyph drawing for the character g. Changing the glyph dramatically changes the aspect of what is displayed. The text may alter characters of various size and rotation that will make it unable to be, understood especially if the text overlap.

An example is provided to help understanding the concept. The following example relates to the transformations based on zoom. The bounding box of a glyph is part of Font definition and is fixed as part of glyph design, so it is easy to apply a transformation matrix to the definition point regardless of the defined bounding box. This allows altering the text, dramatically overlapping many types altogether.

Figure 3:
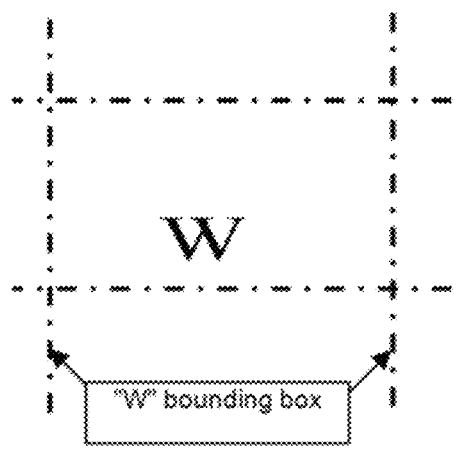
FIG. 3 illustrates the bounding box of character W shown in FIG. 1a after alteration.
Figure 4:
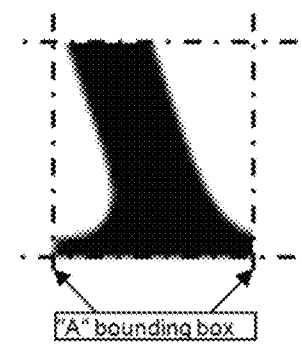
FIG. 4 shows the bounding box of character A shown in FIG. 1A after alteration.

FIG. 3 illustrates the bounding box of character W shown in FIG. 1a after alteration, and FIG. 4 shows the bounding box of character A shown in FIG. 1A after alteration. FIGS. 3 & 4 show the characters W and A within the original bounding box. In FIG. 3 for example, the character W is shrunk to 20% vertically and to 25% horizontally. In FIG. 4, the glyph of character A is enlarged by 300% and eventually only the bottom right footer of the character can appear through the bounding box associated with it (that most font format use also as a cropping box), or they will overlap with other part of the page.

Assume for example that the transformations shown in FIGS. 3 and 4 are implemented in the font of the word "Wagons" shown in FIG. 1a. In the present case the drawing of character "W" may be called with a transformation matrix asking for a 400% zoom horizontally and 500% vertically to restore the proper size after the shrinking of the character by 20% vertically and 25% horizontally (as shown in FIG. 3). Similarly the character "A" may be called with a transformation matrix asking for a 25% shrink to restore the 400% zoom discussed above in connection with FIG. 4.

Figure 5:
FIG. 5 illustrates how the text would look like if it was copied and pasted, i.e. without the modifications made in FIGS. 3&4 which cancel or restore the changes made in the transformation matrix.

FIG. 5 illustrates how the text would look like if it was copied and pasted, i.e. without the modifications made in FIGS. 3&4 which cancel or restore the changes made in the transformation matrix. However, when the original unaltered text is being displayed it would like that shown in FIG. 1a because the one change is meant to cancel the other, thereby attempting to copy and paste the text or portions thereof or altering the latter may only result in a display of abnormal and/or illegible drawings such as that shown in FIG. 5.

It should be noted that while the four characters "goes" were left intact in the text for the sake of clarity and simplicity. However, nothing prevents modification of most or all of the characters in the text to prevent tampering/copying. Also, for the sake of clarity the modifications shown are extremely minor compared to the extent allowed by a transformation matrix that allows for rotation, independent X and zooming, flip, scaling and slant of the glyph or the lines and curves defining the glyph as shown in FIGS. 6 & 7. FIG. 6 illustrates the control points of the word "WAgons" of FIG. 1a, and FIG. 7 illustrates the control points P0 to P4 defining three Bezier curves together defining an arch.

The final result may also use text overlap as explained earlier in addition to the glyph alterations, thus making obfuscation very difficult to break.

The final result is sometime even benefiting from the fact that many font renderer machinery internally try to use integer arithmetic for sake of speed. So that when dealing with very small real values, as used to described many curves of a glyph the rounding errors can amplify dramatically the unpleasant appearance of a text, or even can completely impaired the rendering of it.

Non-Intrinsic Alterations

In an embodiment, it is possible to modify the content of the data that describes the path used to draw the graphical expression of the display of a character, to perform additional alterations using interesting characteristics of curves like Beziers curves when control points are changed. In this later case of usage, the rules used to modify the control points must be knows and eventually transmitted to the final application that will process the font data to reverse the alteration.

In an embodiment, the scripting language is transmitted with the page and its font so that many different rules or evolution can coexist. This also allows for increasing the flexibility to tailor font alteration on a user by user basis, either to avoid transfer of text between users if some local key system is not implemented within the reading application, or because the transformation itself allows to express a kind of signature that uniquely identifies the user that emits the text, deterring illegal use or copying. This can even be extended on a page by page basis, making extremely difficult to break the rules required for restoring alteration.

The following description will focus also on the glyph part of the font.

FIG. 8 illustrates an example of the Bezier curves of FIG. 7 when the control points P0-P4 have been displaced. Similarly, FIG. 9 illustrates an exemplary drawing of the word "Wagons" of FIG. 6 when the control points have been displaced. It should be noted that the level of distortion may be adjusted in accordance with the need. For example, in FIG. 9, the word "WAgons" is still legible and the reader can still recognize most of the shapes of the letters. However, in reality it is possible to dramatically increase the level of distortion to make the text completely illegible as exemplified in FIGS. 10a&10b.

Figure 10A:
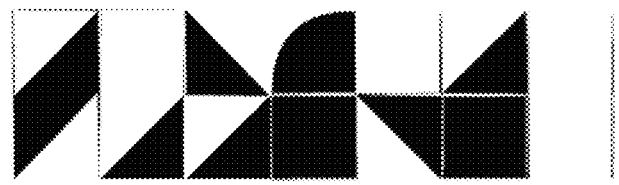
FIGS. 10a&10b illustrate an exemplary drawing of the word "Wagons" of FIG. 6 with a higher distortion level than FIG. 9.
Figure 10B:
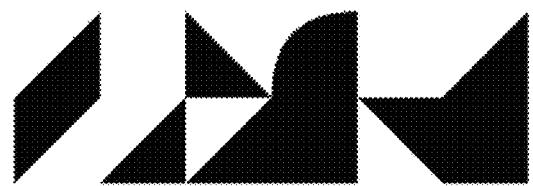

FIGS. 10a&10b illustrate an exemplary drawing of the word "Wagons" of FIG. 6 with a higher distortion level than FIG. 9.

Figure 11:
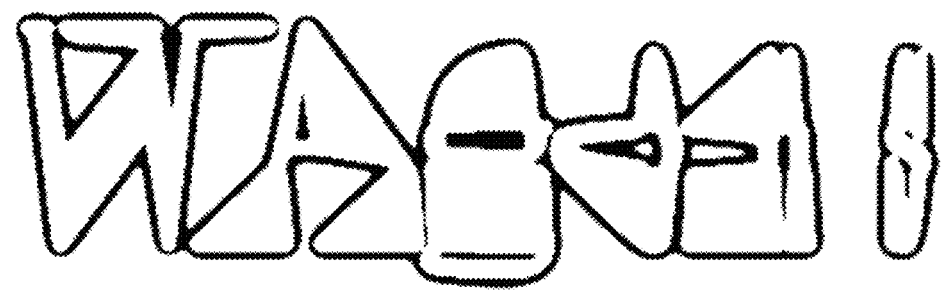
FIG. 11 illustrates an exemplary drawing of the word "Wagons" of FIG. 6 slightly distorted for the sake of understanding using a displacement of control points and a slight change in kerning values.
Figure 12:
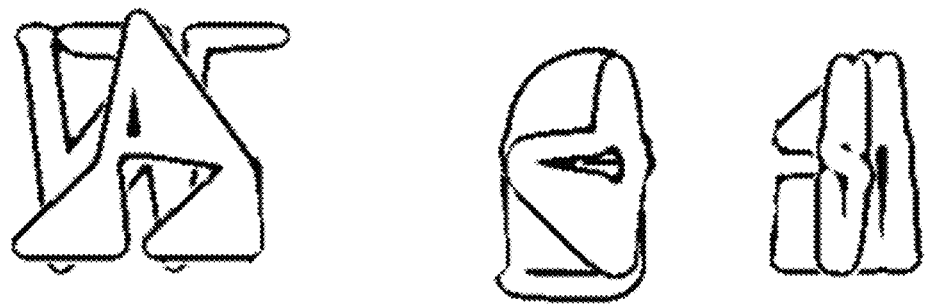
FIG. 12 illustrates an exemplary drawing of the word "Wagons" of FIG. 6 using the same control point displacement as FIG. 11 but with a more distorted change of the kerning values.

FIG. 11 illustrates an exemplary drawing of the word "Wagons" of FIG. 6 slightly distorted for the sake of understanding using a displacement of control points and a slight change in kerning values. Still for clarity purposes the distortion is slight and the reader can still guess the characters even with a margin of error. FIG. 12 illustrates an exemplary drawing of the word "Wagons" of FIG. 6 using the same control point displacement as FIG. 11 but with a more distorted change of the kerning values. As shown in FIG. 12, some of the characters are overlapping in groups. This may be achieved using a direct "type" X move. The proper position should be compensated if properly decoded using the internal font "Kerning" table that will work exactly to reverse this translation of characters.

For sake of clarity the characters 1) are not perfectly overlaid, 2) grouped to distinguish the principle, and 3) slightly edged with a gray line to help understanding edge.

Figure 13:
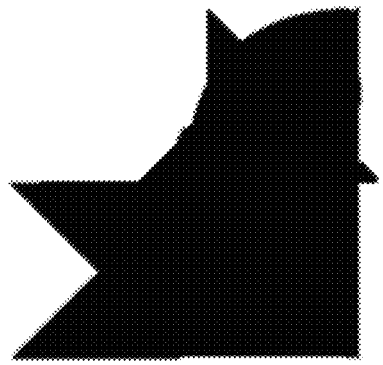
FIG. 13 illustrates an exemplary drawing of the word "Wagons" of FIG. 6 using the same control point displacement as FIG. 12 but with a more distorted change of the kerning values.

FIG. 13 illustrates an exemplary drawing of the word "Wagons" of FIG. 6 using the same control point displacement as FIG. 12 but with a more distorted change of the kerning values. In reality, the embodiment may only show a set of black shapes as per FIG. 12 but overlaid using the move and kerning explained above. Accordingly, without the key values to restore the "Kerning" and restore the position of curves the control points will be unknown in the final aspect.

Display Obfuscation

In summary, the intrinsic obfuscation of the present embodiments may include different mixes/aggregations of the following methods making it impossible to reconstruct the original text without the proper code:

1. Reversible Change of Character Positioning:

As discussed above, using a modified kerning table in the font characters may be swapped leading to a profound alteration of the text.

2. Reversible Change of Character to Glyph Mapping:

Each character entry of a font mapping from a character to a glyph can be used to map a drawing of another kind e.g. display the glyph "X" for the character "Y". As most frequently, the total number of glyphs is far less than capable of encoding mapping, it is even possible to alter the text and introduce in the original text string characters that are of no real correspondence in other fonts but which display correctly when using the specially adjusted font with its peculiar mapping. Otherwise said, not only can the "X" draw a "Y", but the Unicode indexed as a "X"+1000 may also draw a "X", so that at random place where a "X" is needed, the mapping can use various different glyphs so that trying to find the reverse mapping for example using statistical method base on frequency of appearance of type will be more difficult to use.

3. Reversible Change of Character Size

Changing size of character is also a way to make the display very inconvenient for reading. Mathematically it can easily range between 0.1 to 100.

4. Reversible Change of Character Color

Characters can also be encrypted using a color-coded scheme that makes their color vary. While of lesser interest this is helping cases where the number of characters is rather small in the text (typically less than 512) as it allows to inject random, characters that will be hidden and optically disappear when rendered using the proper decoding for colors and spacing (they can be injected using background color and can be preset outside of viewable area, while still being in the stream of the text)

5. Association of Distortions

These distortions of the display allow to drastically modifying the text making very difficult for an unauthorized user to user to obtain a legible display of the text.

In an embodiment, the coding principle can either use a main coefficient for distortion used across all transformations. Or a set of coefficients independently used in order to increase the strength of obfuscation so that breaking a first set will not allow breaking another. As characters positioning is reasserted, they can be regrouped to increase the randomness in order to avoid a partial break to generate clue as where some key character can be (avoiding the "cross word" game capability to detect the right word by correlation to a dictionary).

6. Preventing Copy/Past

When an action like copy/past is used, two main methods exist to catch the displayed content: 1. straight capture of the string used for text description and 2. an analysis of the sequence of characters as they are displayed. As an example dealing with the PDF format. Some applications consider a two-columns text as a contiguous set of string across the horizontal axis and some other more friendly application consider the columns as block and reposition start of current point when a new columns is started.

The first kind of application is a challenge for PDF Reader applications because a friendly cut/past requires a positional analysis to detect a columns change. By contrast, the second one allows directly a straight capture of the set of string used to display the text. As the obfuscation modifies the positioning of characters the first kind of detection for cut/past is easily avoided. However the second kind must be taken care of to avoid a simple re-composition of text. Embodiments of the invention remap the glyph representation associated with a character and reciprocally the text should reflect this simple remapping to avoid the second type of copy/paste operations.

7. Controlled Randomization of Text Code

Currently, the font allows to hold many glyphs, for example 65000 while the text may use only about 100 characters for example including the alphabet, upper+lower+figures+punctuation.

The embodiments use this abundant availability of unused characters to not only transform existing glyphs but to also create additional glyphs that will represent the same characters but using a different drawing path. This may be achieved with the many modern font formats because font description for extended Roman alphabet uses a couple of thousand only.

Some other formats even allow for an infinite extension to the number of glyphs. This allows using many characters code to display the same aspect, so that coding of the text can already be obfuscated using this process. As an example the ASCII code of the character "A" can have a given description and the ASCII code of "A+256" can have the same one. In this case, the text may contain extended ASCII like UTF8 coding and by choosing one "a" or the other the display may look as expected but the text itself is not making senses. This is only one part of the obfuscating process.

8. Glyph Extension of the Curves Definition

Because a re-mapping of code to glyph is a rather simplistic approach, even if additional code is used in place of original text code, it contains a natural flaw allowing easy de-obfuscation because the number of glyphs used to display a character is a strong indication of the characters itself that should be coded with it. For example an "I" is a vertical rectangle and fare less difficult to described as a "R" or a "g".

Therefore breaking the coding used for mapping char code to glyph is made easier by accounting the probability of a character using its typical drawing complexity. Subsequently, the modification of font glyphs must be also handled to modify the number of curves used for display.

For example the vertical straight line of the character "I" can very well be described with a multiplicity of straight segments. While it seems that the best rules is to increase the number of curves to match the one of the most complex characters, implementation limits are of concern.

Naively it can be said that if all glyph have a number of curves that match the most complex one this method of estimating will fail. However it is also putting too much constraint on the glyph drawing engine even for simple characters like a dot. It was found that the glyph complexity can be increased to become part of a one of a group defined by the number of curves needed to draw it and that if the group count is small enough, code breaking done using statistical evaluation will most probably fail. So that a tradeoff strategy to normalize the number of curves involved in drawings glyph can be done efficiently. In one embodiment, it is possible to adjust for each glyph the number of curves to create groups.

For example, the number of lines and curves to write the character "C" is typically 6 curves (3 on each side) and 2 lines to connect the two sides. By contrast for the character "I" there is only four lines (as in a rectangle). Accordingly, the number of curvers/lines may give an idea of the character being displayed, and this info may be used by a forger to estimate the character. In order to avoid this, the embodiments standardize the number of curves and lines in a glyph of characters by adding extraneous lines and curves to make it harder to recognize the character by the number of curves and lines.

A non limitative example to reduce the computation done by the glyph drawing engine is to use a mechanics made of 5 buckets, each bucket containing glyphs that use a fixed number of curves, starting with at least the original minimal number of curves necessary to describe the glyph. The first bucket may be made of 5 curves glyphs, typical of amount necessary to draw a punctuation dot, the last bucket containing at least the glyph that require the highest number of curves. In-between are statistically dispersed number of curved needed for glyph, the minimal number of glyph of each original description define which buckets it belong then the glyph is modified to exactly match the number of curves that the is characteristic of the bucket.

Additionally Capabilities Non-Intrinsic to Font Format

If the capability exists to re-compute the glyph curves, reversible change of aspect of display can be done, using a script on destination side to reverse the rules used. As described and as shown in FIGS. 10a to 12 and associated description, the rules that can be mathematically applied to modify the Bezier curves can be far more elaborated than a simple multiplication and can use a cascading effect whereby the value of the next coefficient is made from the multiplication of previous one to increase the variety without computational efforts.

The present invention will be more readily understood by referring to the following examples which are given to illustrate the invention rather than to limit its scope.

EXAMPLE 1

With reference to FIG. 14a there is shown the electronic page description of a regular non obfuscated font in PDF for the word "WAGON", while FIG. 14b illustrates an example of an obfuscated electronic page description for displaying the word "WAGON" in PDF.

As shown in FIG. 14a, the page description language (PDL) shows the base font as being the Times-Roman at 150 and calls for this font at 152 (see "TRoman 1 tf Times-Roman") to use the glyphs of this font for the display of characters of the word WAGON as shown at 153 ([(WAGON)]TJ). Realize that the ASCII code for character A is 65 (see: FirstChar 65 at 151) and the ASCII code for character W is 87 (see LastChar 87). As shown at 151 the characters of this font extend between are A to W (the choice of FirstChar65 and LastChar 87 is defined by the fact that A and W define a portion of the alphabet characters needed for the word WAGON whereby A defines one extremity and W define the opposite one and the character G, N and O fall in between).

By contrast, the PDL of the obfuscated font of FIG. 14b includes modified instructions to display a different word "BKUEN" using a different spacing and calls a customized font (F1) having a different character to glyph arrangement and a different kerning table in order to correctly display the word WAGON on the display device for the user. Absence of the proper information such as the description of the modified font makes the display of the proper text impossible at rendering time. This will be explained in further detail hereinbelow.

As shown at 155 the instructions included in the PDL are for writing the word "BKUEN". The PDL defines a new font at 157 (realize the location of the file of new font is: 8 0 R as opposed to 7 0 R in FIG. 14a; realize also the new font name: Times-RomanOBSCURED1452 instead of Times-Roman in FIG. 14a). As shown at 154 the new font has characters that extend between B and U (as opposed to A and W in WAGON in FIG. 14a). B and U define the portion of the alphabet characters needed for the word BKUEN whereby B defines one extremity and U define the opposite one and the character E, K and N fall in between. Realize that the ASCII code for character B is 66 (see: FirstChar 66 at 154) and the ASCII code for character U is 85 (see LastChar 85 at 154). As shown at 156 the instruction call for the specially modified font from "4 0 obj" to use the new font instead of the existing/standard font. The instructions are also for writing the word BKUEN as indicated at 155.

The new font Times-RomanOBSCURED1452 is a specially modified font whereby:

The character B displays the glyph of W;
The character K displays the glyph of A;
The character U displays the glyph of G;
The character E displays the glyph of O;
The character N displays the glyph of N;

The character K is shifted by +24;
The character U is shifted by −48; and
The character E is shifted by +27

By calling the specially modified font Times-RomanOBSCURED1452, and introducing the instructions in the PDL that reverse the changes of this font for the characters being drawn [(B)-24 (K) 48 (U)-27 (E) (N)]TJ, a reversible change is occurring which displays the original text "WAGON" and prevents tampering and illegal copying of the text/PDL. In other words, instruction of the PDL to display B will result in the first character drawn being W, the instruction of −24(K) will result in an A being drawn next to W since the K draws an A and −24 cancels the +24 and so on . . . .

Accordingly, any attempts to tamper or illegally copy the instructions in the PDL or the characters appearing on the display will fail and will provide the wrong information/results/code.

For the sake of simplicity, the example provided above with respect to FIGS. 14a and 14b deals only with a single modified font and a simple modification of kerning. However, an infinite number of fonts can be provided and different combinations of fonts may be used in the same PDL. Furthermore, different combinations of obfuscations methods can be used in the sale PDL e.g. character sizes, colors, Bezier curves, kerning, character to glyph mapping etc. making it impossible to detect the change and reconstruct the original text.

In an embodiment, a system and method are provided which transform a non-obfuscation PDL of a given text into an obfuscated PDL using one or more of the obfuscation methods described above. The combination of obfuscation methods include one or more reversible changes into the PDL whereby copying of the PDL will result in one or more of:

1.) odd/abnormal/irregular/illegible shapes being drawn as exemplified in FIGS. 5 and 9 to 13; and
2.) display of different text e.g. BKUEN instead of WAGON;

FIG. 14c illustrates another example of an obfuscated electronic page description for displaying the word "WAGON" in PDF. The obfuscation used in the example of FIG. 14c affects zooming, kerning shift, and mapping.

FIG. 14d shows an example of an electronic page description of a regular non obfuscated font in Postscript for the word "WAGON", and FIG. 14e illustrates an example of an obfuscated electronic page description in Postscript for displaying the word "WAGON".

Figure 15:
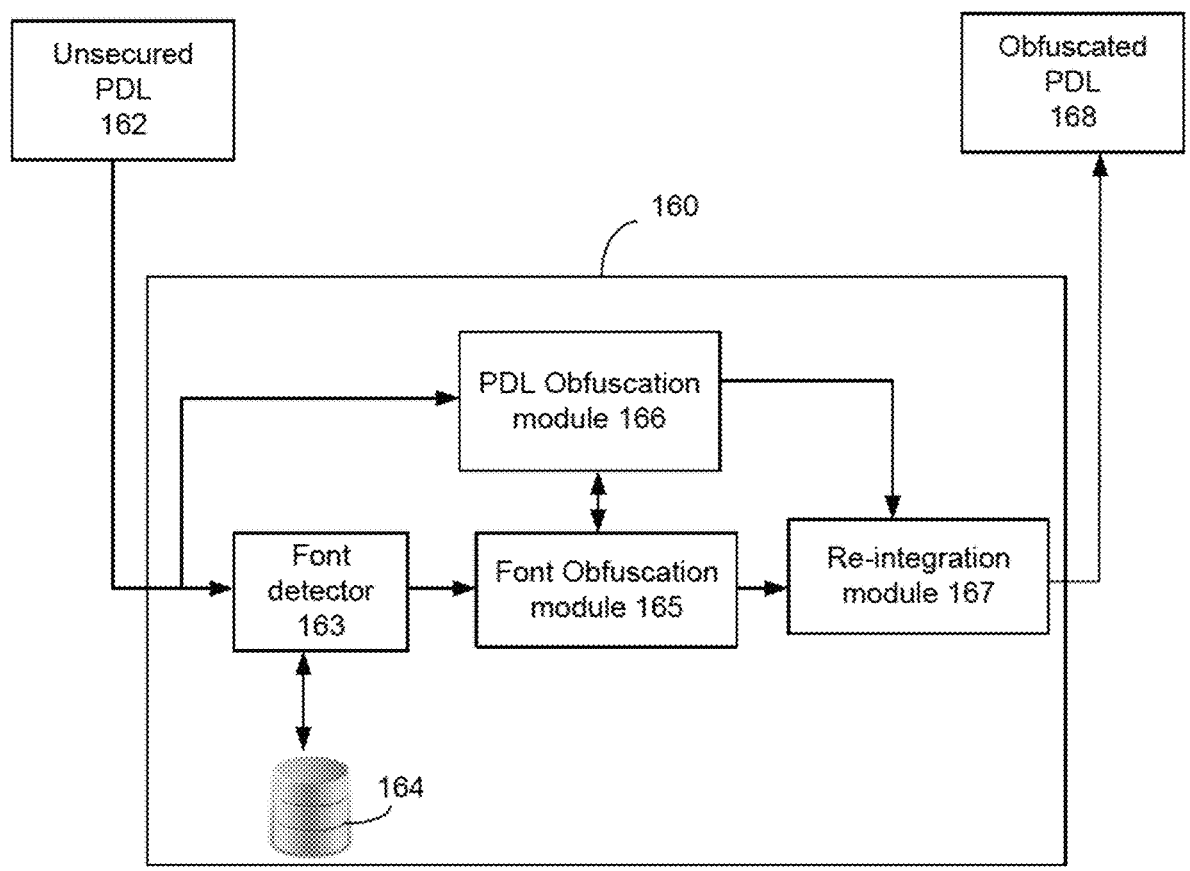
FIG. 15 describes an example of an obfuscation system for transforming the PDL of a given text to a secured PDL.

FIG. 15 describes an example of an obfuscation system 160 for transforming the PDL of a given text to a secured PDL. As shown in FIG. 15, the obfuscation system 160 may receive as input an unsecured PDL 162 for a given text. The obfuscation system 160 may be configured to analyse the existing font that is detected in the electronic document and modify the existing font to generate a customized font including a first set of changes that differentiate the customized font from the existing font. In a non-limiting example of implementation, the system 160 may include a font detector 163 configured to detect the font and all aspects thereof that may be obfuscated. If no font is detected, a base font is fetched from a library of base fonts 164. The detected font or the base font may then be sent to a font obfuscation module 165. The font obfuscation module is adapted to generate from the existing font/base font a customized font including a first set of changes that differentiate the customized font from the existing font. A PDL obfuscation module 166 may receive the un-obfuscated PDL and analyse it in light of the first set of changes generated by the font obfuscated module 165 so as to generate a second set of changes that reverse the effect of the first set of changes. The PDL obfuscation module 166 and the font obfuscated module 165 may be connected to a PDL re-integration module to integrate the first set of changes in the font and the second set of changes in the PDL into a single harmonized PDL (which is the obfuscated PDL 168) which complies with the format of non-obfuscated PDLs and may be read by conventional PDL readers/interpreters.

In an embodiment, the system may be configured to analyse the existing font that is detected in the electronic document and modify the existing font to generate a customized font including a first set of changes that differentiate the customized font from the existing font. In an embodiment, the customization of the font may include some sort of controlled randomization whereby the same PDL may have different obfuscated versions. The controlled randomization in this context is intended to mean that the level of obfuscation does not go below an accepted minimum but at the same time produces obfuscated PDL versions which are acceptably different from each other in order to complicate/avoid the reverse engineering of the obfuscation method used.

In a non-limiting example, the system may be configured to introduce a controlled randomization which includes a requirement that from every five characters at least two characters would have a change of size of at least 400%. The randomisation aspect may for example be to leave the system to randomly chose those two characters.

Similar types of controlled randomization may apply using any of the above obfuscation methods and different combinations thereof.

In an embodiment, when no font is being detected in the PDL, a base font is fetched from a library of fonts and modifications are made to the base font in accordance with the embodiments discussed above. For example, the base font maybe chosen using rules used for substituting a font in case where the font is missing from the document.

In an embodiment, both the first set of changes and the second set of changes may be included in the obfuscated PDL of the electronic document. In another embodiment, a portion of the changes may be made available at rendering time only. For example, the portion of the changes (in the form of scripting language or otherwise) which is missing from the PDL may be stored locally on the computing device or remotely on another computer or memory device (which is accessible via a wired or wireless communications network) such that when instructions are received to open the document the system may verify the presence of authorization to open the file prior to opening it. Whereby, if authorization is confirmed the system may call for the missing portion of the changes from the local/remote memory to embed/execute the changes at rendering time to correctly display the obfuscated text on the display device. Otherwise, if no authorization is present the system may only display the text resulting form the modified PDL which will be a different and/or illegible version of the obfuscated text.

In a further embodiment, it is possible to personalise a font for a given user to store on their computing device and then send the user one or a plurality of obfuscated PDLs of different obfuscated text documents, such plurality of obfuscated PDLs are tailored for the personalized font and will be only decrypted/de-obfuscated using that personalised font. In which case, the personalised font may act as a key for opening secret documents received from remote locations thus avoiding the scenario of sending the encoded information and the code for decoding the encoded information over the communications network.

Figure 16:
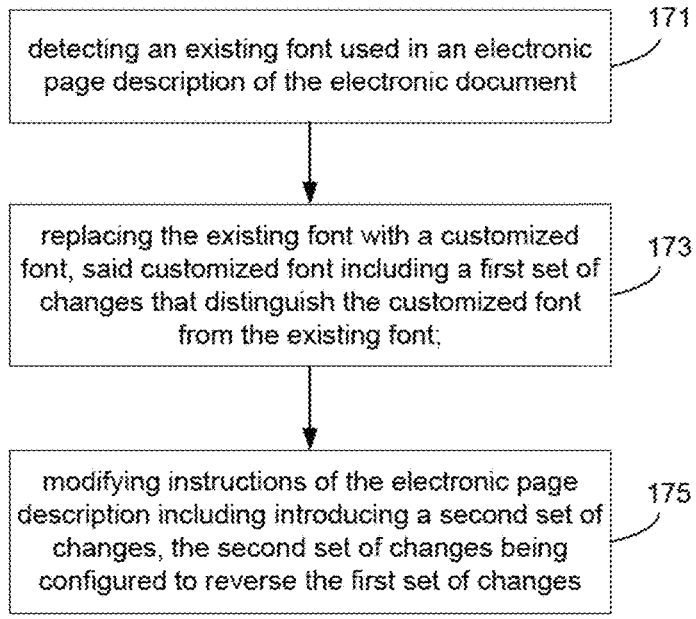
FIG. 16 is a flowchart of a method for obfuscating an electronic document including a text, in accordance with an embodiment.

FIG. 16 is a flowchart of a method for obfuscating an electronic document including a text, in accordance with an embodiment. The method begins at step 171 by detecting an existing font used in an electronic page description of the electronic document. Step 173 comprises replacing the existing font with a customized font, said customized font including a first set of changes that distinguish the customized font from the existing font. Step 175 comprises modifying instructions of the electronic page description including introducing a second set of changes, the second set of changes being configured to reverse the first set of changes. Thereby producing an obfuscated electronic document which allows for displaying the text only when the first set of changes and the second set of changes are present at rendering time.

Figure 17:
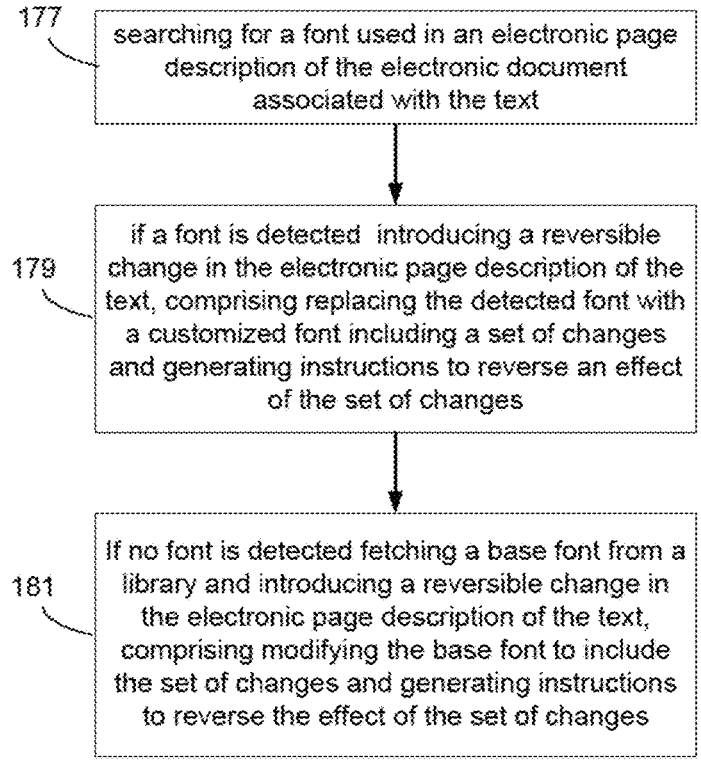
FIG. 17 is a flowchart of a method for obfuscating an electronic document including a text, in accordance with another embodiment.

FIG. 17 is a flowchart of a method for obfuscating an electronic document including a text, in accordance with another embodiment. The method begins at step 177 by searching for a font used in an electronic page description of the electronic document associated with the text. Step 179 comprises, if a font is detected, introducing a reversible change in the electronic page description of the text, comprising replacing the detected font with a customized font including a set of changes and generating instructions to reverse an effect of the set of changes. However, If no font is detected step 181 comprises fetching a base font from a library and introducing a reversible change in the electronic page description of the text, comprising modifying the base font to include the set of changes and generating instructions to reverse the effect of the set of changes. Thereby, producing a secure electronic document which allows for displaying the text only when the set of changes and the instructions reversing the set of changes are present at rendering time.

In another embodiment, the document can be sent without its associated font, it can even be available on a server freely and few pages can be free of obfuscation while some others can be obfuscated. In a non-limiting example, the server may make available obfuscated documents, each being made with different obfuscation parameters, while storing the obfuscation parameters on the server for de-obfuscation. In some embodiments, a rendered version of the display may be done and stored as images.

In this embodiment the user can later ask to have the document de-obfuscated to display the proper glyphs. In which case, the document needs to be identified first so that the Glyph in forms of a Font can be re-computed or restored. The user can then obtain/capture the obfuscated display and send it to a Right Management system on the server. This can be done in the form of a "Screen capture", or with an Augmented Reality experience, with a SmartPhone having the camera activated and pointed at the display screen on which the obfuscated display is being rendered. An image recognition software, using for example a GIST image descriptor and LSH tree (Locally sensitive Hashing), may receive the captured image and recognize the display to establish the identity of the obfuscated document using the image of the obfuscated display.

This in turn allows the server to send or make available the proper font which will enable a friendly/legible/original display of the document. This feature is made possible because a controlled transformation of the aspect of the Glyphs (without proper correction for display) induces a rather unique aspect on the characters rendered as exemplified in FIG. 10a. Variation of the distortion parameters establishes a unique identity of display that can be used as to identify the document represented by the image received. This allows the Right Management system to prepare the proper font or set of font that allow to render the de-obfuscated display of the text. The delivery of such font can then be under control of the publisher. It must be noted that the same word but with different rendering obfuscation can lead to many variation all being of a decently unique nature. This in itself create the correlation ID necessary to understand which document is displayed by the user of interest.

Hardware and Computing Environment

Figure 18:
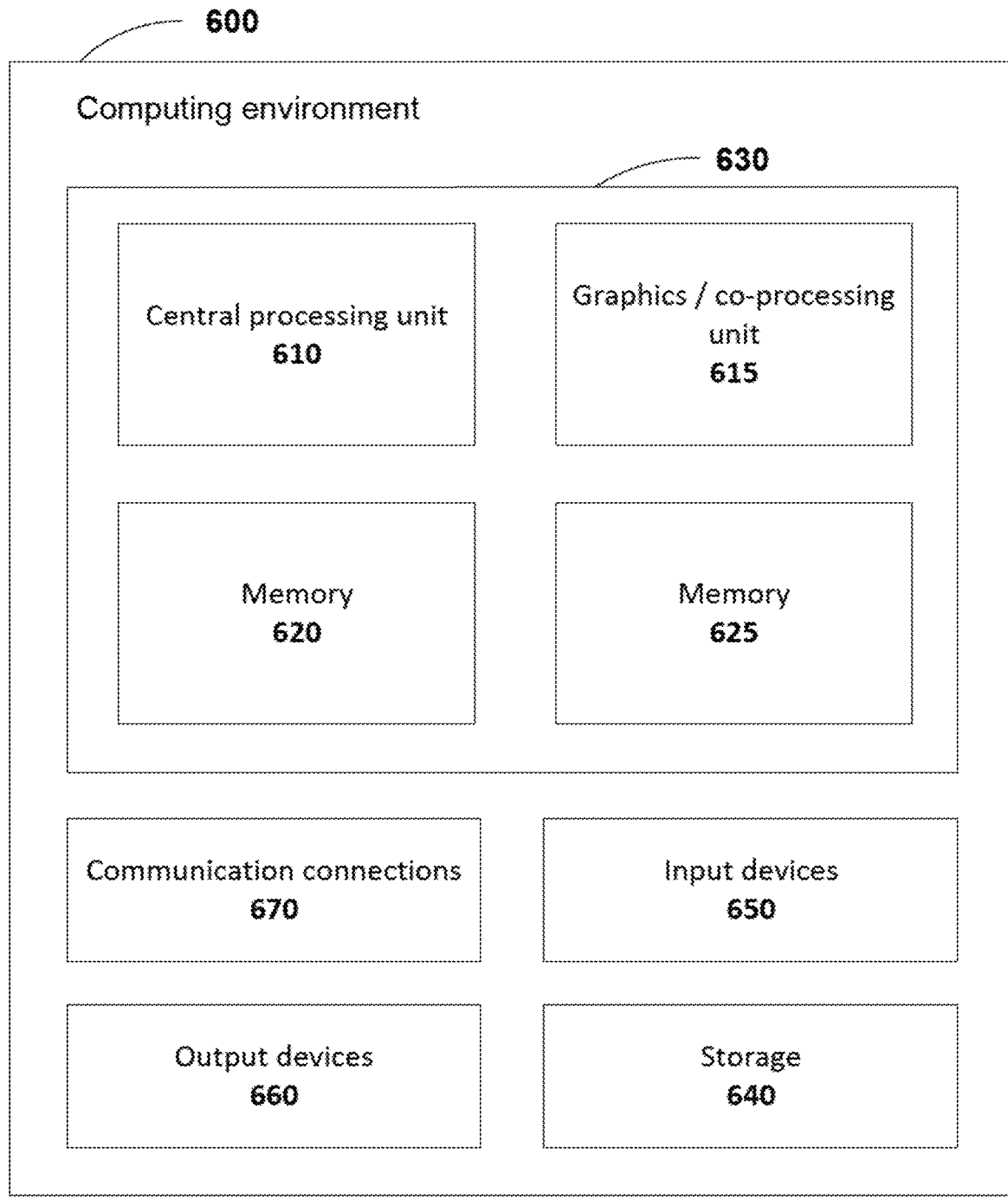
FIG. 18 illustrates a generalized example of a suitable computing environment in which the described embodiments may be implemented.

Embodiments of the invention described herein can be implemented in a computing environment. FIG. 18 illustrates a generalized example of a suitable computing environment 600 in which the described embodiments may be implemented. The computing environment 600) is not intended to suggest any limitation as to scope of use or functionality, as the techniques and tools may be implemented in diverse general-purpose or special-purpose computing environments.

With reference to FIG. 18, the computing environment 600 includes at least one CPU 610 and associated memory 620 as well as at least one GPU or other co-processing unit 615 and associated memory 625 (used for example for video acceleration). In FIG. 18, this most basic configuration 630 is included within a dashed line. The processing unit 610 executes computer-executable instructions and may be a real or a virtual processor. In a multi-processing system, multiple processing units execute computer-executable instructions to increase processing power. A host encoder or decoder process offloads certain computationally intensive operations to the GPU 615. The memory 620,125 may be volatile memory (e.g., registers, cache, RAM), non-volatile memory (e.g., ROM, EEPROM, flash memory, etc.), or some combination of the two. The memory (620, 625) stores software 680 for a decoder implementing one or more of the decoder innovations described herein.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, DVDs, or any other medium which can be used to store information and which can be accessed within the computing environment 600. The storage 640 stores instructions for the software 680.

The input device(s) 650 may be a touch input device such as a keyboard, mouse, pen, or trackball, a voice input device, a scanning device, or another device that provides input to the computing environment 600. For audio or video encoding, the input device(s) 650 may be a sound card, video card, TV tuner card, or similar device that accepts audio or video input in analog or digital form, or a CD-ROM or CD-RW that reads audio or video samples into the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 600, computer readable media include memory 620, storage 640, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description may use terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

While preferred embodiments have been described above and illustrated in the accompanying drawings, it will be evident to those skilled in the art that modifications may be made without departing from this disclosure. Such modifications are considered as possible variants comprised in the scope of the disclosure.

For example, the embodiments relating to modifications of the Bezier curves may also be applied to other types of curves such as BSpline, arc, etc.

The invention claimed is:

1. A method for obfuscating an electronic document including an original text for detecting tampering with and/or preventing copying from the electronic document, the method comprising:

generating for the electronic document a set of reversible changes for obfuscating the electronic document, the electronic document having a plurality of characters, each character having a transformation matrix specific to that character and defining a specific drawing aspect for that character, wherein at least a portion of the reversible changes are applied in the transformation matrices to cause a display of odd/abnormal/irregular/illegible shapes preventing access to a legible display of the characters;

replacing an existing font used for displaying the original text with a customized font, said customized font including the set of reversible changes that distinguish the customized font from the existing font, the set of reversible changes when executed cause the display of the odd/abnormal/irregular/illegible shapes;

modifying an electronic page description of the electronic document including introducing instructions that implement a second set of changes within the electronic page description of the electronic document, the second set of changes reversing an effect of the set of reversible changes;

generating an obfuscated electronic document having an obfuscated text that displays as the original text only when the set of reversible changes and the second set of changes are available at rendering time wherein tampering with and/or copying from the obfuscated electronic documents will result in the display of the odd/abnormal/irregular/illegible shapes.

2. The method of claim 1, wherein the set of reversible changes include a set of controlled randomization changes, and replacing the existing font used for displaying the original text comprises analyzing said existing font and modifying said existing font using the set of controlled randomization changes to generate the customized font.

3. The method of claim 1, wherein the existing font used for displaying the original text is a standard font, a base font fetched from a library of fonts, or a non-standard font that complies with the electronic page description.

4. The method of claim 1, wherein the set of reversible changes affect sizes of the characters.

5. The method of claim 1, wherein the set of reversible changes affect curves and/or control points defining the curves and/or lines.

6. The method of claim 1, wherein the set of reversible changes affect drawing positions of the characters and/or independent X and Y zooming of the characters.

7. The method of claim 1, wherein the set of reversible changes affect color of the characters.

8. A computer having a processor and a memory accessed by the processor, the computer implementing the method of claim 1.

9. A method for obfuscating an electronic document including an original text for detecting tampering with and/or preventing copying from the electronic document, the method comprising:
searching in an electronic page description associated with the electronic document for a font used for displaying the original text, the electronic document having a plurality of characters, each character having a transformation matrix specific to that character and defining a specific drawing aspect for that character;
if a font is detected, introducing reversible changes in the electronic document wherein at least a portion of the reversible changes are applied in the transformation matrices to cause a display of odd/abnormal/irregular/illegible shapes preventing access to a legible display of the characters, and comprising replacing the detected font with a customized font including the reversible changes which when executed cause a display of the odd/abnormal/irregular/illegible shapes and generating instructions to reverse an effect of the reversible changes within the electronic page description of the electronic document;
if no font is detected fetching a base font from a library and introducing the reversible changes in the electronic document wherein at least a portion of the reversible changes are applied in the transformation matrices to cause a display of the odd/abnormal/irregular/illegible shapes, comprising modifying the base font to include the reversible changes which when executed cause the display of the odd/abnormal/irregular/illegible shapes and generating instructions to reverse the effect of the reversible changes;
generating an obfuscated electronic document having an obfuscated text that displays as the original text only when the reversible changes and the instructions reversing the reversible changes are available at rendering time, wherein tampering with and/or copying from the obfuscated electronic document will result in the display of the odd/abnormal/irregular/illegible shapes.

10. The method of claim 9, wherein replacing the detected font comprises analyzing the detected font and modifying the detected font using a set of controlled randomization changes to generate the customized font from the detected font.

11. The method of claim 9, wherein the reversible changes affect curves and/or control points defining the curves and/or lines and/or positions of the characters and/or independent X and Y zooming of the characters.

12. An apparatus comprising:
a processor and a memory device in communication with the processor and having recorded thereon computer readable statements and instructions for obfuscating an electronic document including an original text for detecting tampering with and/or preventing copying from the electronic document, the electronic document having a plurality of characters, each character having a transformation matrix specific to that character and defining a specific drawing aspect for that character, the apparatus further including:
a font detector module that detects an existing font used in an original electronic page description (original (page description language) (PDL) file) associated with the electronic document;
a font obfuscator module that analyzes the existing font and modifies the existing font using a set of controlled randomization changes to generate a customized font having a first set of changes which differentiate the customized font from the existing font and which when executed cause a display of odd/abnormal/irregular/illegible shapes preventing access to a legible display of the characters;
a PDL obfuscator module that analyzes the original PDL file and the first set of changes to modify the original PDL file and produce a second set of changes configured to reverse an effect of the first set of changes; wherein at least a portion of the first set of changes and/or the second set of changes is applied in the transformation matrices to cause the display of the odd/abnormal/irregular/illegible shapes; and
a PDL re-integrator module that integrates the second set of changes and the first set of changes into an obfuscated PDL file which is compatible with a PDL file reader, and generates an obfuscated electronic document comprising the obfuscated PDL file, a modified font and a modified text that displays as the original text, wherein tampering with and/or copying from the obfuscated electronic document will result in the display of the odd/abnormal/irregular/illegible shapes;
wherein the font detector module and the PDL obfuscator module are each arranged to receive as an input the original PDL file, the font obfuscator module is arranged to receive the detected existing font from the font detector module, the PDL obfuscator module is in communication with the font obfuscator module, the PDL re-integrator module is connected to both the PDL obfuscator module and the font obfuscator module, and the PDL re-integrator module is arranged to output the obfuscated PDL file.

13. The apparatus of claim 12, wherein the apparatus further includes a set of controlled randomization changes that analyzes the existing font and modify the existing font to produce the customized font.

14. The apparatus of claim 12, wherein if no font is specified in the original PDL file, the font detector module fetches a base font from a library and sets the base font as the existing font.

15. The apparatus of claim 12, wherein the first set of changes affect curves and/or control points defining the curves and/or lines.

16. The apparatus of claim 15, wherein the first set changes affect one or more of: positions of characters and/or independent X and Y zooming of the characters; and sizes of the characters.

17. A method for obfuscating an electronic document including an original text for detecting tampering with and/or preventing copying from the electronic document, the method comprising:
  generating for the electronic document a set of reversible changes for obfuscating the electronic document, the electronic document having a plurality of characters, each character having a transformation matrix specific to that character and defining a specific drawing aspect for that character, wherein at least a portion of the reversible changes are applied in the transformation matrices to cause a display of odd/abnormal/irregular/illegible shapes;
  replacing an existing font used for displaying the original text with a customized font, said customized font including the set of reversible changes that distinguish the customized font from the existing font, the set of reversible changes when executed cause the display of the odd/abnormal/irregular/illegible shapes;
  modifying an electronic page description of the electronic document including introducing instructions that implement a second set of changes within the electronic page description of the electronic document, the second set of changes reversing an effect of the set of reversible changes;
  generating an obfuscated electronic document having an obfuscated text that displays as the original text only when the set of reversible changes and the second set of changes are available at rendering time wherein tampering with and/or copying from the obfuscated electronic documents will result in the display of the odd/abnormal/irregular/illegible shapes.

\* \* \* \* \*